(12) United States Patent
Koda et al.

(10) Patent No.: US 6,866,948 B2
(45) Date of Patent: Mar. 15, 2005

(54) MAGNETIC RECORDING MEDIUM AND MAGNETIC RECORDING APPARATUS

(75) Inventors: Tetsunori Koda, Moriya (JP); Hideaki Yamanaka, Toride (JP); Enji Fujita, Matsudo (JP); Satoshi Matsunuma, Kamakura (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/665,016

(22) Filed: Sep. 22, 2003

(65) Prior Publication Data

US 2004/0067390 A1 Apr. 8, 2004

(30) Foreign Application Priority Data

Oct. 8, 2002 (JP) .......................................... 2002-294716
Dec. 27, 2002 (JP) .......................................... 2002-379436

(51) Int. Cl.[7] ............................... G11B 5/66; G11B 5/70
(52) U.S. Cl. .......................... 428/694 TS; 428/694 TM; 428/611; 428/668; 428/900; 428/336
(58) Field of Search ................... 428/694 TS, 694 TM, 428/611, 668, 900, 336

(56) References Cited

U.S. PATENT DOCUMENTS

2004/0001975 A1 * 1/2004 Hikosaka et al. ...... 428/694 BA
2004/0072027 A1 * 4/2004 Lu et al. ................. 428/694 R

FOREIGN PATENT DOCUMENTS

| JP | A 2001-006158 | 1/2001 |
|---|---|---|
| JP | A 2001-222809 | 8/2001 |
| JP | A 2001-229527 | 8/2001 |
| JP | A 2002-63714 | 2/2002 |
| JP | A 2002-100030 | 4/2002 |
| JP | A 2002-197620 | 7/2002 |
| JP | A 2002-208126 | 7/2002 |
| JP | A 2002-230735 | 8/2002 |
| JP | A 2002-269731 | 9/2002 |

OTHER PUBLICATIONS

Soichi Oikawa et al.;"High Performance CoPtCrO Single Layered Perpendicular Media with No Recording Demagnetization." IEEE Transactions on Magnetics, vol. 36, No. 5; Sep. 2000.

Yoshiyuki Hirayama et al.; "Low Noise Performance of CoCrPt Single–Layer Perpendicular Magnetic Recording Media." IEEE Transactions on Magnetics, vol. 36, No. 5; Sep. 2000.

Yukiko Kubota et al.; "Development of CoX/Pd multilayer perpendicular magnetic recording media with granular seed layers." Journal of Magnetism and Magnetic Materials 242–245 (2002) 297–303, no month.

M. Futamoto et al.; "Improvement of initial growth layer in CoCr–alloy thin film media." Journal of Magnetism and Magnetic Materials 226–230 (2001) 1610–1612, no month.

* cited by examiner

Primary Examiner—Holly Rickman
(74) Attorney, Agent, or Firm—Oliff & Berridge, PLC

(57) ABSTRACT

A magnetic recording medium based on the perpendicular recording system, which has high coercivity and low medium noise, is provided by using an underlayer which has a thin film thickness and which makes it possible to improve the orientation of a recording layer. The magnetic recording medium based on the perpendicular recording system has the recording layer which is formed of a CoPtCr alloy magnetic film containing oxygen. The magnetic recording medium has such a structure that an adhesive layer 2, a soft magnetic back layer 3, the underlayer 4, the recording layer 5, and a protective layer 6 are successively stacked on a substrate 1. A CoCrRu film, which has a film thickness of 5 nm to 20 nm, is used as the underlayer for the recording layer formed of the CoPtCr alloy magnetic film containing oxygen. Thus, it is possible to improve the crystalline orientation of the recording layer with the underlayer having the thin film thickness.

12 Claims, 4 Drawing Sheets

MAGNETIC RECORDING MEDIUM AND MAGNETIC RECORDING APPARATUS

BACKGROUND OF THE INVENTION

1. Field of the Invention:

The present invention relates to a magnetic recording medium and a magnetic recording apparatus. In particular, the present invention relates to a magnetic recording medium based on the perpendicular magnetic recording system suitable for the high density recording, and a magnetic recording apparatus.

2. Description of the Related Art:

In recent years, as the information oriented society is advanced, it becomes possible to process, for example, not only the character information but also the voice information and the image information at high speeds. One of the apparatuses capable of processing the information as described above at the high speed is a magnetic recording apparatus which is installed, for example, to a computer. The magnetic recording apparatus is being developed in order to realize a further small size while improving the recording density.

In general, the magnetic recording apparatus comprises a plurality of magnetic disks which are rotatably installed on a spindle. Each of the magnetic disks comprises a substrate and a magnetic film (appropriately referred to as "recording layer" as well) which is formed on the substrate. Information is recorded by forming magnetic domains having specified directions of magnetization in the magnetic film. Conventionally, the direction of magnetization subjected to the recording in the magnetic film is the in-plane direction of the magnetic film. This system is called "in-plane recording system". The realization of the high density recording on the magnetic disk based on the in-plane recording system can be achieved by thinning the film thickness of the magnetic film, providing minute grain diameters of magnetic crystal grains which constitute the magnetic film, and reducing the magnetic interaction between the respective magnetic crystal grains. However, when the magnetic crystal grains are made to be fine and minute and the magnetic interaction between the magnetic crystal grains is reduced, then the thermal stability of the recorded magnetization is deteriorated. In order to solve this problem, a magnetic disk based on the perpendicular recording system has been suggested.

In the perpendicular recording system, the direction of magnetization of the magnetic domain in the magnetic film is perpendicular to the film surface to perform the recording. When this system is used, then the interstice between the adjoining recording bits is magnetostatically stabilized, the thermal stability is improved, and the recording transition area becomes sharp. Further, when a layer formed of a soft magnetic material (hereinafter referred to as "soft magnetic back layer") is added between the substrate and the recording layer of the magnetic disk based on the perpendicular recording system, then the magnetic field, which is applied to the recording layer during the recording of information, can be converged, and it is possible to perform the recording on a magnetic material having higher magnetic anisotropy. It is possible to perform the recording at higher recording densities, because the magnetization of the magnetic material having the high magnetic anisotropy has high thermal stability.

A CoCr-based alloy is used for the recording layer of the magnetic disk based on the in-plane recording system described above. It is tried to similarly apply the CoCr-based alloy to the recording layer of the magnetic disk based on the perpendicular recording system as well. A two-phase separation structure, which is composed of the ferromagnetic crystal grains having a high Co concentration and the non-magnetic crystal grain boundary having a high Cr concentration, is formed in the recording layer formed of the CoCr-based alloy. The magnetic interaction between the ferromagnetic crystal grains can be shut off by the non-magnetic crystal grain boundary. Accordingly, the low noise of the medium, which is required for the high density recording, has been hitherto realized.

However, in order to realize the recording at higher densities, it is necessary to further reduce the magnetic interaction between the crystal grains. There is a method for solving this problem, in which the crystal grain boundary is made of oxide in the recording layer formed of the CoCr-based alloy. Such a method is carried out by adding an oxide to a sputtering target, or by forming a film of the recording layer in an oxygen gas atmosphere. A medium, which comprises the recording layer composed of the CoCr-based oxide obtained by such a method, has an oxide granular structure in which the magnetic crystal grains of the recording layer are surrounded by the oxide. The magnetic interaction between the magnetic crystal grains is further reduced by the oxide granular structure, and it is possible to further reduce the medium noise of the magnetic recording medium.

When the medium, which comprises the recording layer composed of the CoCr-based oxide, is manufactured, it is necessary that the crystalline orientation of the recording layer is controlled so that the easy axis of magnetization of the recording layer formed of the CoCr-based oxide is directed in the direction perpendicular to the film surface. For this purpose, an underlayer or underlying base layer is used. The crystalline structure of the CoCr-based oxide is the hcp (hexagonal close-packed lattice) structure, and the easy axis of magnetization thereof resides in the c-axis direction. Therefore, in order that the c-axis of the CoCr-based oxide is oriented in the direction perpendicular to the film surface, it is necessary to provide the underlayer which has the same hcp structure as that of the CoCr-based oxide. The element, which has the same hcp structure as that of the crystalline structure of the CoCr-based oxide, includes Ti, Ru, and alloys thereof. An exemplary magnetic recording medium, which has an underlayer formed of such an element, has been suggested. In this magnetic recording medium, a CoPtCrO magnetic layer is used for a recording layer, and the underlayer is obtained by combining a first underlayer which is mainly composed of Ti and a second underlayer which is mainly composed of Ru as disclosed in Japanese Patent Application Laid-open No. 2001-6158 (p. 3, FIG. 1). Another magnetic recording medium based on the in-plane recording system has been also disclosed in Japanese Patent Application Laid-open No. 2002-208126 (pp. 4 to 5, FIGS. 1 to 2), in which a CoPtCr alloy magnetic film is used for a recording layer, and a CoCrRu film is used for an underlayer.

According to the knowledge of the present inventors, it is considered that the improvement in the crystalline orientation of the recording layer is limited as a matter of course when the underlayer is formed with a single layer of film mainly composed of Ti. For example, in Japanese Patent Application Laid-open No. 2001-6158, the crystalline orientation of the recording layer is improved by combining the first underlayer which is mainly composed of Ti and the second underlayer which is mainly composed of, for example, Ru. That is, it is necessary that a plurality of underlying base films are combined in order to further improve the crystalline orientation of the recording layer. Therefore, the film thickness of the underlayer is thickened in the case of the magnetic recording medium as disclosed in Japanese Patent Application Laid-open No. 2001-6158. However, the soft magnetic back layer is provided between the underlayer and the substrate in order to improve the recording characteristics in the case of the magnetic recording medium based on the perpendicular recording system. When the plurality of underlayers are used in order to improve the crystalline orientation of the recording layer, an accidental problem arises such that the distance between the soft magnetic back layer and the recording layer is increased to cause a phenomenon in which the magnetic coupling between the both is inhibited, and the recording characteristics are deteriorated.

On the other hand, the magnetic recording medium disclosed in Japanese Patent Application Laid-open No. 2002-208126 is a magnetic recording medium based on the in-plane recording system. The c-axis of the crystal of the CoPtCr alloy magnetic film containing oxygen as its magnetic recording film is directed in the in-plane direction. Therefore, it is essentially difficult to perform the perpendicular magnetic recording in which the areal recording density is high. Japanese Patent Application Laid-open No. 2002-208126 describes that only the CoCrRu layer is insufficient as the underlayer for the recording layer, and it is essential to stack this layer and a layer which is composed of at least one of Ru, Re, and Os and which contains oxygen. It is taught that a plurality of underlayers are necessary. The magnetic recording medium as disclosed in Japanese Patent Application Laid-open No. 2002-208126 is based on the in-plane recording system. Therefore, it is unnecessary to decrease the distance (so-called magnetic spacing) between the magnetic pole of the writing head and the surface of the soft magnetic back layer. Such a magnetic recording medium does not solve the problem inherent in the perpendicular magnetic recording system, i.e., the problem in which the steepness of the slope of the writing magnetic field distribution disappears as the distance between the recording layer and the soft magnetic back layer is increased, and it becomes impossible to form small recording bits, resulting in the failure in the high density recording.

In view of the above, the present inventors have obtained the following knowledge. That is, it is necessary to develop a new underlayer which has a thin film thickness and which remarkably improves the orientation of a recording layer even with only one layer in order to realize the further high density recording while suppressing the deterioration of the recording characteristics in a magnetic recording medium based on the perpendicular recording system comprising the recording layer composed of CoCr-based oxide. Thus, the present invention has been made.

SUMMARY OF THE INVENTION

An object of the present invention is to provide a novel magnetic recording medium which solves the problem involved in the conventional technique as described above, which is based on the perpendicular recording system comprising a recording layer composed of CoCr-based oxide, and which successfully has a thin film thickness of an underlayer by being constructed with one layer of the underlayer, wherein the orientation of the recording layer is high, and thus the coercivity is high with low medium noise.

According to a first aspect of the present invention, there is provided a magnetic recording medium comprising a soft magnetic back layer which is formed of a soft magnetic material; an underlayer; and a recording layer which is formed directly on the underlayer, which is composed of an alloy magnetic material mainly composed of CoPtCr containing oxygen, and which has residual magnetization in a direction perpendicular to a film surface larger than residual magnetization in an in-plane direction of the film surface; the soft magnetic back layer, the underlayer, and the recording layer being formed in this order on a non-magnetic substrate; wherein the underlayer is formed of an alloy mainly composed of CoCrRu.

The present inventors manufactured magnetic recording media having underlayers formed of Ti, Ru, and alloy thereof having the same hcp structure (hexagonal close-packed structure) as that of the CoPtCr alloy magnetic film containing oxygen for forming the recording layers to evaluate magnetic characteristics and recording and reproduction characteristics thereof. As a result, the following fact was revealed. That is, the crystalline orientation of the recording layer was successfully controlled by using the underlayer formed of Ti, Ru, and alloy thereof. However, in order to successfully effect the control, it was necessary that the film thickness of the underlayer exceeded 40 nm, which resulted in the deterioration of the recording characteristics. On the other hand, in the case of the thin film thickness of not more than 40 nm, the crystallinity of the recording layer was deteriorated, and it was unsuccessful to perform any sufficient high density recording.

In the magnetic recording medium of the present invention, the CoCrRu film, in which Ru is mixed with the non-magnetic CoCr alloy, is used as the underlayer for the recording layer which is formed of the CoPtCr alloy magnetic film containing oxygen. The crystalline structure of the CoCrRu film used for the underlayer is the same hcp structure (hexagonal close-packed structure) as that of the CoPtCr alloy magnetic film containing oxygen used for the recording layer. When the CoCrRu film is used as the underlayer for the recording layer, the c-axis, which is the easy axis of magnetization of the CoPtCr alloy magnetic film containing oxygen, can be subjected to the crystalline orientation in the direction perpendicular to the in-plane of the recording layer, even when the film thickness of the underlayer is thin, i.e., not more than 40 nm. Accordingly, it is possible to enhance the crystalline orientation of the recording layer formed of the CoPtCr alloy magnetic film containing oxygen, and it is possible to improve the static magnetic characteristics. Further, it is also possible to avoid the deterioration of the recording characteristics, because the film thickness of the underlayer is thin. The recording layer has such a structure that the magnetic crystal grains are surrounded by oxide, because the recording layer is formed of the CoPtCr alloy magnetic film containing oxygen. The magnetic interaction between the crystal grains is reduced in the recording layer. That is, according to the present invention, it is possible to provide the magnetic recording medium which has the high coercivity, which has the lower medium noise, and which makes it possible to perform the recording at the high recording density. In the magnetic recording medium of the present invention, the rocking curve half-value width of the (002) peak in the X-ray diffraction of CoPtCr having the hexagonal close-packed structure of the recording layer can be made to be not more than 8 degrees.

In the magnetic recording medium of the present invention, it is preferable that the underlayer, which is formed of the alloy mainly composed of CoCrRu, has a film thickness of 5 to 20 nm. When the film thickness of the underlayer is not less than 5 nm, the crystalline orientation of the recording layer formed on the underlayer is secured. When the film thickness of the underlayer is not more than 20 nm, then the crystal grains of the underlayer scarcely become coarse, and it is possible to suppress the increase in medium noise. Further, it is possible to decrease the distance between the recording layer and the soft magnetic back layer as described later on. Thus, the recording characteristics are improved.

In the magnetic recording medium of the present invention, it is preferable that the underlayer is a single layer. It is desirable that the underlayer, which is formed of the alloy mainly composed of CoCrRu, is non-magnetic. It is preferable that the composition ratio of Co is 1 to 65 at. %. When the Co concentration of the underlayer is within this range, it is possible to secure the non-magnetism.

In the magnetic recording medium of the present invention, it is preferable that the underlayer, which is formed of the alloy mainly composed of CoCrRu, contains at least one element selected from the group consisting of Rh, Ir, Hf, Cu, Ag, Au, Re, Mo, Nb, W, Ta, Ti, V, Zr, Pt, Pd, B, and C. Accordingly, the lattice match is improved between the CoCrRu film of the underlayer and the CoPtCr alloy magnetic film containing oxygen formed as the recording layer thereon.

In the magnetic recording medium of the present invention, the soft magnetic back layer has such a role that the magnetic flux leaked from the magnetic head is converged on the recording layer when information is recorded/reproduced in the recording layer by using the magnetic head. As for the material for the soft magnetic back layer, it is preferable to use a soft magnetic material which has large saturation magnetization, which has small coercivity, and which has high magnetic permeability. For example, it is preferable to use a CoTaZr film. It is desirable that the film thickness of the soft magnetic back layer is within a range of 50 to 500 nm.

In the magnetic recording medium of the present invention, it is preferable that the thickness of the recording layer is not more than 20 nm. Further, it is preferable that the oxygen content of the CoPtCr alloy magnetic film containing oxygen for forming the recording layer is 5 to 20 at. %. The CoPtCr alloy magnetic film containing oxygen is formed by using a mixed gas of argon and oxygen as the sputtering gas. When the mixing ratio therebetween is appropriately regulated, it is possible to introduce 5 to 20 at. % oxygen in a dispersed state into the CoPtCr alloy magnetic film. Alternatively, the oxygen content in the CoPtCr alloy magnetic film can be also changed by regulating the amount of oxygen contained in the target. For example, it is possible to use a target obtained by mixing $SiO_2$ or MgO at a ratio of several % to several tens % in the CoPtCr target. When the CoPtCr alloy magnetic film, which contains 5 to 20 at. % oxygen, is used, then it is possible to reduce the magnetic interaction between the magnetic crystal grains, and it is possible to provide the medium having low medium noise. When the oxygen content in the CoPtCr alloy magnetic film is larger than 5 at. %, then the magnetic grains are sufficiently separated from each other, and the reduction of the medium noise is achieved. The incorporation of oxygen into the magnetic crystal grains is avoided by decreasing the oxygen content to be less than 20 at. %. Thus, it is possible to avoid the deterioration of the magnetic characteristics.

The present inventors manufactured magnetic recording media having recording layers formed of CoPtCr alloy magnetic films containing 5 to 20 at. % oxygen to verify the oxygen contents in the CoPtCr alloy magnetic films. At first, as a result of the $\mu$-EDX measurement with plane TEM, it has been revealed that the oxygen contained in the CoPtCr alloy magnetic film preferentially oxidizes Cr to give a form of Cr oxide which surrounds the Co magnetic grains and which exists between the grains. Further, it has been revealed that the crystal grains of the recording layer are made fine and minute by introducing the oxygen into the CoPtCr alloy magnetic film. It is considered that the magnetic interaction between the crystal grains is reduced by the fine and minute crystal grains of the recording layer and the Co magnetic grains surrounded by the Cr oxide, and thus the medium noise of the magnetic recording medium can be reduced.

Further, a magnetic recording medium having a recording layer formed with a CoPtCr alloy magnetic film containing no oxygen was manufactured to measure the signal-to-noise ratio (S/N ratio) which was compared with the S/N ratios of the magnetic recording media having recording layers formed of CoPtCr alloy magnetic films containing 5 to 20 at. % oxygen. As a result, the S/N ratio of the magnetic recording medium composed of the CoPtCr alloy magnetic film mixed with oxygen was improved by 12 dB as compared with the S/N ratio of the magnetic recording medium composed of the CoPtCr alloy magnetic film containing no oxygen. If the oxygen content of CoPtCr alloy magnetic film is less than 5 at. %, then the magnetic interaction between the crystal grains is intensified, and the S/N ratio is deteriorated. If the oxygen content of the CoPtCr alloy magnetic film is more than 20 at. %, the S/N ratio was deteriorated due to the deterioration of the magnetic characteristics. According to the verification as described above, it has been revealed that the content of oxygen contained in the CoPtCr alloy magnetic film is preferably 5 to 20 at. % in order to provide the medium having the low medium noise by further reducing the magnetic interaction between the crystal grains.

In the magnetic recording medium of the present invention, it is preferable that Si or Mg is contained by 3 to 15 at. % in the CoPtCr alloy magnetic film containing oxygen. When Si or Mg is mixed at the content of 3 to 15 at. % in the CoCrPt alloy magnetic film containing oxygen, then it is possible to improve the coercivity of the magnetic recording medium, and it is possible to realize the low noise of the medium. The method for mixing Si or Mg in the CoPtCr alloy magnetic film containing oxygen includes a method in which the sputtering is performed by using a target which is mixed with $SiO_2$ or MgO at a ratio of several % to several tens % in the CoPtCr target. In this method, it is possible to adjust not only the content of Si or Mg but also the content of oxygen. The formed CoCrPt alloy magnetic film has such a structure that $SiO_2$ or MgO exists around the Co magnetic crystal grains.

According to a second aspect of the present invention, there is provided a magnetic recording apparatus having a magnetic recording medium comprising, on a non-magnetic substrate, a soft magnetic back layer which is formed of a soft magnetic material, an underlayer, and a recording layer which is formed directly on the underlayer; the magnetic recording apparatus comprising a magnetic head and a drive unit which drives the magnetic recording medium relatively with respect to the magnetic head; wherein the recording layer is formed of an alloy magnetic material mainly composed of CoPtCr containing oxygen, residual magnetization in the recording layer in the direction perpendicular to the film surface is larger than residual magnetization in the in-plane direction of the film surface, and the underlayer is formed of an alloy mainly composed of CoCrRu. In the magnetic recording apparatus of the present invention, the magnetic head may apply magnetization in a direction perpendicular to a film surface of the recording layer and may apply magnetization in a direction parallel to a film surface of the soft magnetic back layer to constitute a magnetic circuit in cooperation with the recording layer and the soft magnetic back layer.

BRIEF DESCRIPTION OF THE DRAWINGS

FIG. 4 shows schematic views illustrating a magnetic recording apparatus provided with magnetic disks manufactured according to the present invention, wherein

DESCRIPTION OF THE PREFERRED EMBODIMENTS

The magnetic recording medium and the magnetic recording apparatus according to the present invention will be specifically explained below as exemplified by embodiments. However, the present invention is not limited thereto.

First Embodiment

Figure 1:
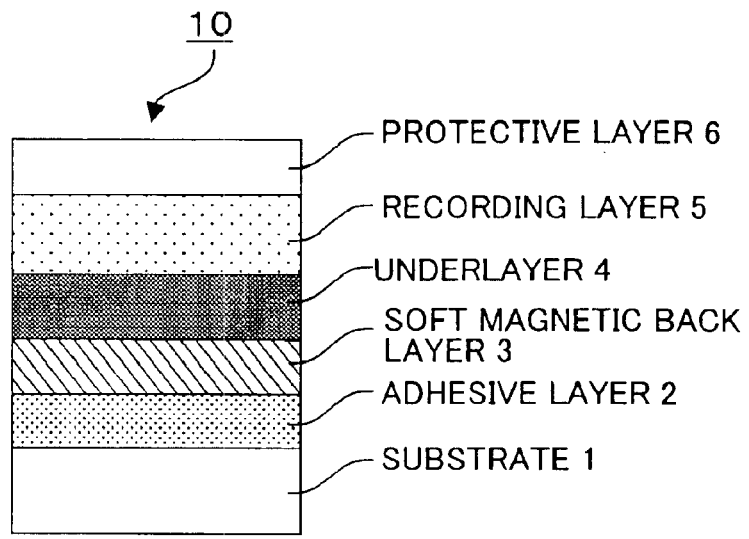
FIG. 1 shows a schematic sectional view illustrating a magnetic disk according to a first embodiment.

FIG. 1 shows a schematic sectional view illustrating a magnetic disk manufactured in a first embodiment. As shown in FIG. 1, the magnetic disk 10 has such a structure that an adhesive layer 2, a soft magnetic back layer 3, an underlayer 4, a recording layer 5, and a protective layer 6 are successively stacked or laminated on a substrate 1. The adhesive layer 2 is provided in order to avoid any exfoliation between the substrate 1 and the films stacked thereon. The soft magnetic back layer 3 is provided in order to converge the magnetic field to be applied to the recording layer when information is recorded. The underlayer 4 is provided in order to improve the orientation of the recording layer 5. The recording layer 5 is the layer in which information is recorded as magnetization information. The direction of magnetization of the recording layer 5 is in the direction perpendicular to the film surface. The protective layer 6 is provided in order to protect the stacked films 2 to 5 which are successively stacked on the substrate 1. An explanation will be made below about a method for manufacturing the magnetic disk manufactured in this embodiment.

A circular disk-shaped glass substrate having a diameter of 2.5 inches (6.25 cm) was used for the substrate 1. The substrate 1 was heated to 260° C. before the film formation. A Ti film was formed as the adhesive layer 2 on the substrate 1 with the DC sputtering. The sputtering condition was as follows. That is, the gas pressure was 0.28 Pa, the introduced electric power was 500 W, and the target was Ti. The film thickness of the adhesive layer 2 was 5 nm.

Subsequently, a CoTaZr film was formed as the soft magnetic back layer 3 on the adhesive layer 2 with the DC sputtering. The sputtering condition was as follows. That is, the gas pressure was 0.28 Pa and the introduced electric power was 400 W. The target had a composition of $Co_{88}Ta_{10}Zr_2$ (at. %). The film thickness of the soft magnetic back layer 3 was 200 nm.

Subsequently, a CoCrRu film was formed as the underlayer 4 on the soft magnetic back layer 3 with the DC sputtering. The sputtering condition was as follows. That is, the gas pressure was 4.2 Pa and the introduced electric power was 500 W. The target had a composition of $Co_{55}Cr_{25}Ru_{20}$ (at. %). The film thickness of the underlayer 4 was 20 nm.

Further, a CoPtCr-SiO$_2$ alloy magnetic film containing oxygen was formed as the recording layer 5 on the underlayer 4 with the RF sputtering. The sputtering condition was as follows. That is, the gas pressure was 4.2 Pa and the introduced electric power was 400 W. The target had a composition of $Co_{64}Pt_{20}Cr_{16}$ (at. %)—SiO$_2$ (CoPtCr: SiO$_2$= 92:8 mol %). The film thickness of the recording layer 5 was 12 nm.

Finally, a C film was formed as the protective layer 6 on the recording layer 5 with the DC sputtering. The sputtering condition was as follows. That is, the gas pressure was 0.20 Pa and the introduced electric power was 300 W. The film thickness of the protective layer 6 was 3 nm.

Figure 2:
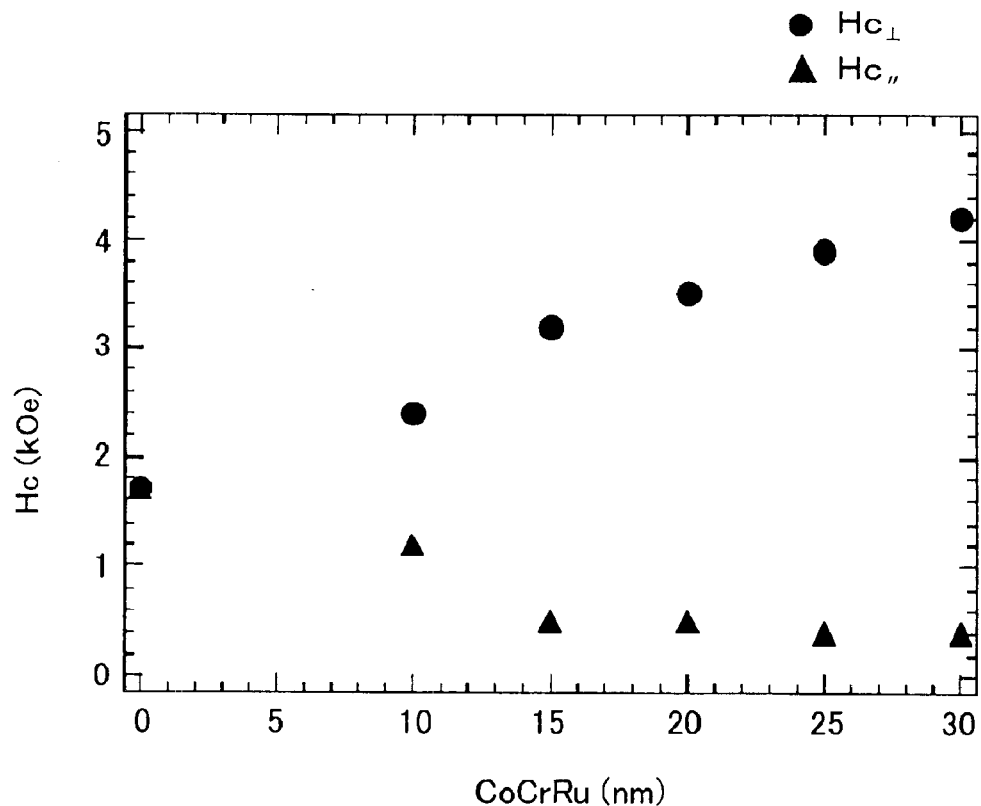
FIG. 2 shows the changes of the perpendicular coercivity $Hc_{195}$ and the in-plane coercivity Hc. of the magnetic disk with respect to the film thickness of a CoCrRu film as an underlayer of the magnetic disk of the first embodiment.
Figure 3:
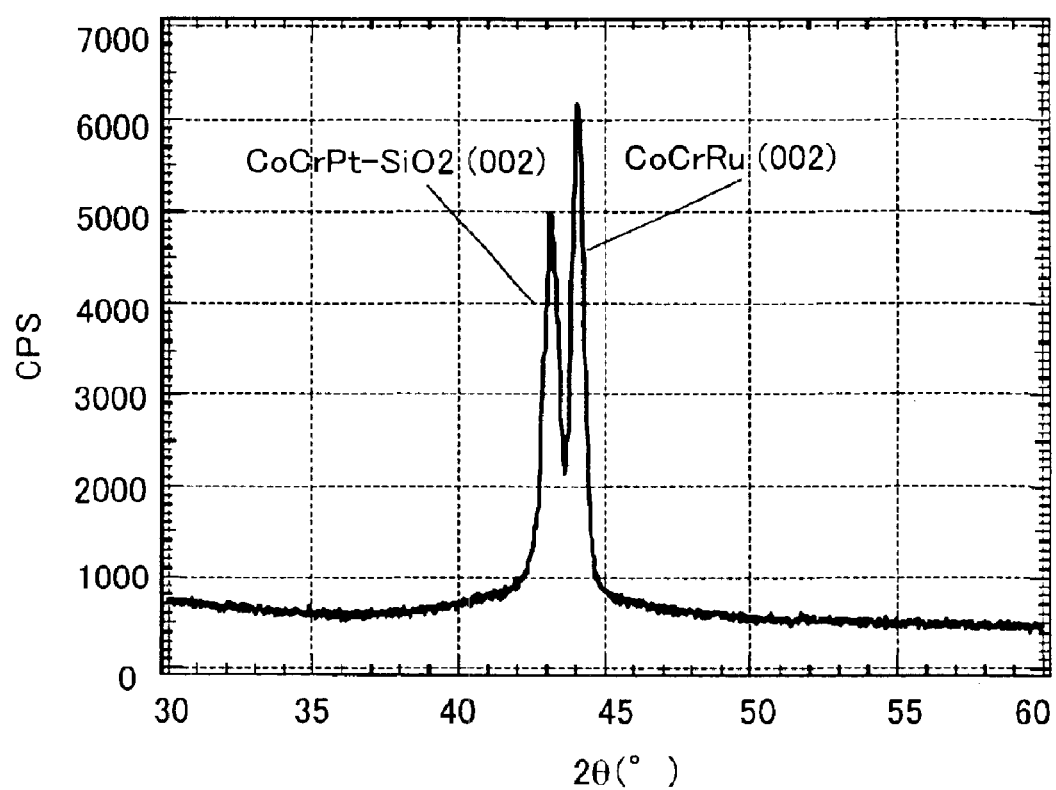
FIG. 3 shows a result of the X-ray diffraction measurement for the surface of the magnetic disk at a film thickness of 20 nm of the CoCrRu film as the underlayer of the magnetic disk of the first embodiment.

In this embodiment, the film thickness of the CoCrRu film of the underlayer 4 was changed within a range of 10 to 40 nm to manufacture a variety of magnetic disks 10 in accordance with the same manufacturing method as that used in the process described above. The coercivities of the respective magnetic disks were measured in the in-plane direction and in the direction perpendicular to the film surface respectively. FIG. 2 shows the changes of the perpendicular coercivity $Hc_\perp$ and the in-plane coercivity Hc. with respect to the film thickness of the CoCrRu film of the underlayer. However, for the purpose of comparison, the coercivity of a magnetic disk having a film thickness of the CoCrRu film of the underlayer of 0 nm, i.e., a magnetic disk provided with no underlayer is also plotted in FIG. 2. As shown in FIG. 2, it has been revealed that the perpendicular coercivity $Hc_\perp$ is increased by providing the CoCrRu film as the underlayer for the recording layer, and the perpendicular coercivity $Hc_\perp$ is increased as the film thickness of the CoCrRu film is increased. On the other hand, as shown in FIG. 2, the in-plane coercivity Hc. was decreased as the film thickness of the CoCrRu film was increased. The X-ray diffraction measurement was performed for the surface of the magnetic disk manufactured in this embodiment. An obtained result is shown in FIG. 3. However, the result shown in FIG. 3 was obtained when the film thickness of the CoCrRu film of the underlayer was 20 nm. As a result, the following fact has been revealed as shown in an X-ray diffraction intensity distribution shown in FIG. 3. That is, peaks corresponding to CoCrRu (002) and CoCrPt-SiO$_2$ (002) are clearly observed. The c-axis, which is the easy axis of magnetization of the CoPtCr alloy magnetic film containing oxygen formed as the recording layer, is oriented in the direction perpendicular to the film surface. Further, a rocking curve of the peak of CoCrPt-SiO$_2$ (002) was measured. As a result, the half value width $\Delta\theta_{50}$ of the rocking curve was 6.0°. That is, it is considered that the coercivity $Hc_\perp$ in the direction perpendicular to the film surface is increased by preferentially orienting the (002) plane of the CoCrRu film of the underlayer in the direction perpendicular to the film surface to effect the lattice match between the hexagonal close-packed type crystals of the recording layer and the underlayer so that the (002) plane of the CoCrPt-SiO$_2$ film of the recording layer is preferentially oriented in the direction perpendicular to the film surface.

Subsequently, a lubricant was applied to have a thickness of 1 nm on the protective layer of the magnetic disk manufactured in this embodiment. After that, the magnetic disks as described above were installed into a magnetic recording apparatus 60 shown in FIG. 4 to evaluate the recording and reproduction characteristics.

Figure 4A:
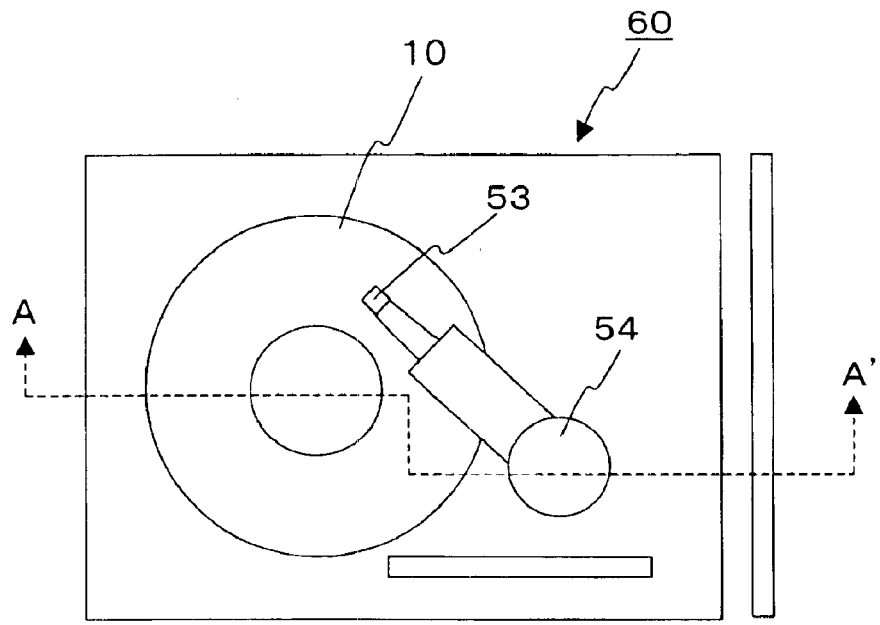
FIG. 4A shows a plan view.
Figure 4B:
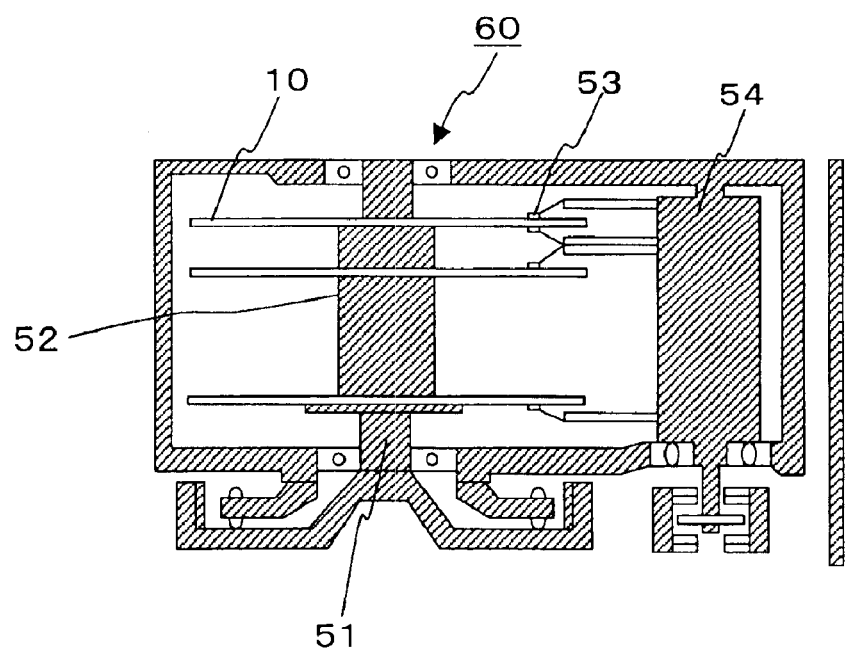
FIG. 4B shows a sectional view taken along a line A-A' shown in FIG. 4A.

FIG. 4 shows a schematic arrangement of the magnetic recording apparatus. FIG. 4A shows a schematic plan view of the magnetic recording apparatus 60, and FIG. 4B shows a schematic sectional view of the magnetic recording apparatus 60 taken along a broken line A-A' shown in FIG. 4A. As shown in FIG. 4B, the magnetic disks 10 are coaxially attached to a spindle 52 of a rotary driving system 51, and they are rotated by the spindle 52.

When information was recorded on the magnetic disk 10 by using the magnetic recording apparatus 60, a thin film magnetic head, which was based on the use of a soft magnetic film having a high saturation magnetic flux density of 2.1 T, was used. When information was reproduced, a spin-valve type magnetic head having the giant magnetoresistance effect was used. The thin film magnetic head for the recording and the spin-valve type magnetic head for the reproduction are integrated into one unit which is indicated by a magnetic head 53 in FIG. 4. The integrated type magnetic head 53 is controlled by a magnetic head driving system 54. The distance between the magnetic disk surface and the magnetic head surface of the magnetic recording apparatus 60 was maintained to be 5 nm. When the magnetic head 53 of the magnetic recording apparatus 60 is used, then the magnetization, which is in the direction perpendicular to the film surface, is applied to the recording layer 5 of the magnetic disk 10, and the magnetization, which is in the direction parallel to the film surface, is applied to the soft magnetic back layer 3. Accordingly, it is possible to constitute a magnetic circuit in cooperation with the recording layer 5 and the soft magnetic back layer 3.

A signal corresponding to a recording density of 700 kfci was recorded on the magnetic disk 10 to evaluate the recording and reproduction characteristic (S/N ratio) of the magnetic disk. However, this test was performed for the magnetic disk in which the film thickness of the CoCrRu film of the underlayer was 20 nm. As a result, there was obtained S/N ratio=25 dB.

Second Embodiment

Figure 5:
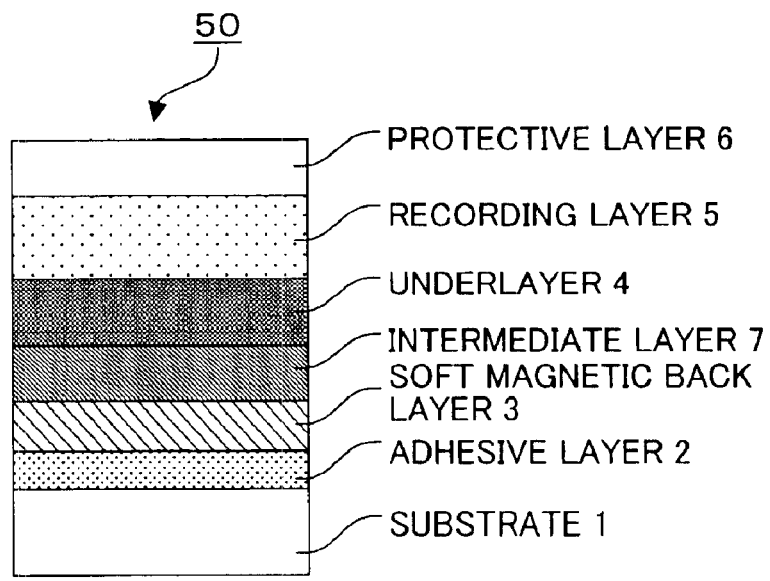
FIG. 5 shows a schematic sectional view illustrating a magnetic disk according to a second embodiment.

FIG. 5 shows a schematic sectional view of a magnetic disk manufactured in a second embodiment. As shown in FIG. 5, the magnetic disk 50 manufactured in this embodiment has such a structure that an adhesive layer 2, a soft magnetic back layer 3, an intermediate layer 7, an underlayer 4, a recording layer 5, and a protective layer 6 are successively stacked or laminated on a substrate 1. The intermediate layer 7 is provided in order to further improve the crystalline orientation of the recording layer 5. An explanation will be made below about a method for manufacturing the magnetic disk 50 manufactured in this embodiment.

At first, a circular disk-shaped glass substrate having a diameter of 2.5 inches (6.25 cm) was used for the substrate 1. A Ti film was formed as the adhesive layer 2 on the substrate 1 with the DC sputtering. The sputtering condition was as follows. That is, the gas pressure was 0.28 Pa, the introduced electric power was 500 W, and the target was Ti. The film thickness of the adhesive layer 2 was 5 nm.

Subsequently, a CoTaZr film was formed as the soft magnetic back layer 3 on the adhesive layer 2 with the DC sputtering. The sputtering condition was as follows. That is, the gas pressure was 0.28 Pa and the introduced electric power was 500 W. The target had a composition of $Co_{88}Ta_{10}Zr_2$ (at. %). The film thickness of the soft magnetic back layer 3 was 200 nm.

Subsequently, a Ti film was formed as the intermediate layer 7 on the soft magnetic back layer 3 with the DC sputtering. The sputtering condition was as follows. That is, the gas pressure was 0.28 Pa, the introduced electric power was 500 W, and the target was Ti. The film thickness of the intermediate layer 7 was 10 nm.

Subsequently, a CoCrRu film was formed as the under layer 4 on the intermediate layer 7 with the DC sputtering. The sputtering condition was as follows. That is, the gas pressure was 0.28 Pa and the introduced electric power was 500 W. The target had a composition of $Co_{55}Cr_{25}Ru_{20}$ (at. %). The film thickness of the underlayer 4 was 10 nm.

Further, a CoPtCr-SiO$_2$ alloy magnetic film containing oxygen was formed as the recording layer 5 on the underlayer 4 with the RF sputtering. The sputtering condition was as follows. That is, the gas pressure was 4.2 Pa and the introduced electric power was 400 W. The target had a composition of $Co_{64}Pt_{20}Cr_{16}$ (at. %)—SiO$_2$ (CoPtCr: SiO$_2$= 92:8 mol %). The film thickness of the recording layer 5 was 12 nm.

Finally, a C film was formed as the protective layer 6 on the recording layer 5 with the DC sputtering. The sputtering condition was as follows. That is, the gas pressure was 0.20 Pa and the introduced electric power was 300 W. The film thickness of the protective layer 6 was 3 nm.

Figure 6:
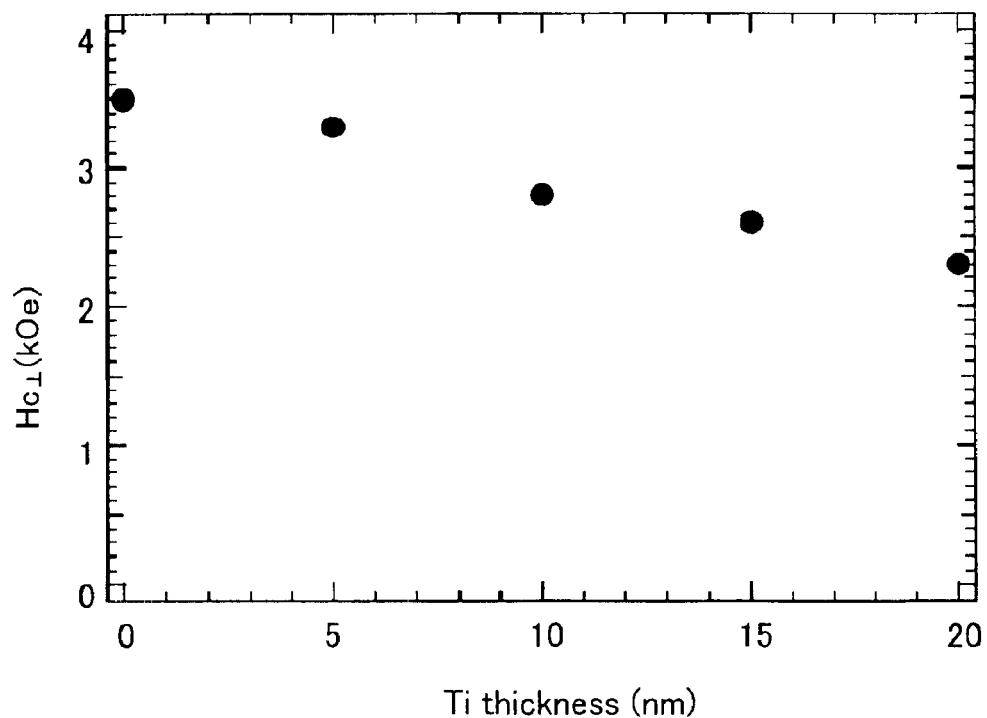
FIG. 6 shows the change of the perpendicular coercivity $Hc_\perp$ of the magnetic disk with respect to the film thickness of a Ti film as an intermediate layer of the magnetic disk of the second embodiment.

In this embodiment, the total film thickness of the Ti film of the intermediate layer 7 and the CoCrRu film of the underlayer 4 was fixed to be 20 nm while changing the film thicknesses of the Ti film and the CoCrRu film to manufacture a variety of magnetic disks 50 in accordance with the same manufacturing method as that used in the process described above. The coercivity was measured in the direction perpendicular to the film surfaces of the respective magnetic disks. FIG. 6 shows the change of the perpendicular coercivity $Hc_\perp$ with respect to the film thickness of the Ti film of the intermediate layer. Further, for the purpose of comparison, the perpendicular coercivity $Hc_\perp$ of a magnetic disk (magnetic disk of the type of the first embodiment) having a film thickness of the Ti film of the intermediate layer of 0 nm, i.e., a magnetic disk provided with no intermediate layer is also plotted in FIG. 6. As shown in FIG. 6, it is appreciated that the magnetic characteristic is slightly deteriorated as the film thickness of the intermediate layer is increased, in the case of the magnetic disk manufactured in this embodiment. According to this results, it has been revealed that when the distance between the recording layer and the soft magnetic back layer is constant, then the crystallinity is more satisfactory and the coercivity of the recording layer is enhanced as well when the underlayer is the single layer. That is, it has been revealed that the underlayer is desirably formed of one layer in the area in which the film thickness is thin.

Subsequently, the magnetic disks manufactured in this embodiment were installed into the magnetic recording apparatus 60 shown in FIG. 4 to evaluate the recording and reproduction characteristics in the same manner as in the first embodiment. However, this test was carried out for the magnetic disks in each of which the film thickness of the CoCrRu film of the underlayer was 10 nm and the film thickness of the Ti film of the intermediate layer was 10 nm. As a result, there was obtained S/N ratio=18 dB. The recording and reproduction characteristic was deteriorated as compared with the S/N ratio (25 dB) of the magnetic disk manufactured in the first embodiment. According to this result, it has been revealed that the underlayer, which is used to control the orientation of the recording layer, is desirably thin, and the underlayer is desirably one layer.

Comparative Example

In Comparative Example, a magnetic disk was manufactured in the same manner as in the first embodiment except that an underlayer of the magnetic disk was formed of an Ru film in place of the CoCrRu film. The Ru film was formed on the soft magnetic back layer with the DC sputtering. The sputtering condition was as follows. That is, the gas pressure was 0.28 Pa, the introduced electric power was 500 W, and the target was Ru. The film thickness of the Ru film was 20 nm.

The X-ray diffraction measurement was performed for the magnetic disk manufactured in Comparative Example in the same manner as in the first embodiment. Table 1 shows the half value widths $\Delta\theta_{50}$ of the rocking curves of the CoCrPt-SiO$_2$ (002) peaks of the magnetic disks manufactured in the first and second embodiments and Comparative Example. However, in Table 1, the value of the half value width $\Delta\theta_{50}$ of the first embodiment resides in the result obtained when the film thickness of the CoCrRu film of the underlayer was 20 nm. The value of the half value width $\Delta\theta_{50}$ of the second embodiment resides in the result obtained when the film thickness of the CoCrRu film of the underlayer was 10 nm and the film thickness of the Ti film of the intermediate layer was 10 nm.

TABLE 1

|  | First embodiment | Second embodiment | Comparative Example |
|---|---|---|---|
| Half value width $\Delta\theta_{50}$ (degrees) | 6.0 | 9.0 | 9.0 |

As shown in Table 1, the half value width $\Delta\theta_{50}$ of the magnetic disk manufactured in the first embodiment was smaller than the half value width of the magnetic recording medium manufactured in Comparative Example. That is, it has been revealed that the c-axis orientation of the recording layer formed of the CoPtCr alloy magnetic film containing oxygen is improved by using the single layer of the CoCrRu film for the underlayer for the recording layer.

Subsequently, the magnetic disks manufactured in Comparative Example were installed into the magnetic recording apparatus 60 shown in FIG. 4 to evaluate the recording and reproduction characteristics in the same manner as in the first embodiment. However, the measurement was performed for the magnetic disk in which the film thickness of the Ru film of the underlayer was 20 nm. An obtained result is shown in Table 2. Table 2 also shows and summarizes the values of the S/N ratios obtained from the playback tests for the magnetic disks manufactured in the first and second embodiments.

TABLE 2

|  | First embodiment | Second embodiment | Comparative Example |
|---|---|---|---|
| S/N ratio (dB) | 25 | 18 | 12 |

As shown in Table 2, the S/N ratio of the magnetic disk of Comparative Example was 12 dB, while the obtained S/N ratios of the magnetic disks of the first and second embodiments were 25 dB and 18 dB respectively. The S/N ratios of the magnetic disks of the first and second embodiments were improved as compared with the S/N ratio of the magnetic disk of Comparative Example. Therefore, it has been revealed that the S/N ratio is improved by using the CoCrRu film as the underlayer for the recording layer formed of the CoPtCr alloy magnetic film which contains oxygen.

The first and second embodiments have been explained as exemplified by the case in which the CoPtCr alloy magnetic film containing oxygen is used for the recording layer of the magnetic disk. However, the present invention is not limited thereto. The CoPtCr alloy magnetic film containing oxygen is crystalline, which has such a structure that the alloy containing the main component of Co exists in the crystal grains and the oxygen is contained between the grains. Therefore, the crystalline Co alloy may contain an element including, for example, Ta, Nb, Ti, Si, B, Pd, V, Mg, and Gd or any combination thereof other than Cr and Pt provided that the hexagonal close-packed structure is formed.

The first and second embodiments have been explained as exemplified by the case in which the glass is used as the substrate material for the magnetic disk. However, the present invention is not limited thereto. It is also allowable to use, for example, aluminum, plastic such as polycarbonate, or resin, if necessary.

The first and second embodiments have been explained as exemplified by the case in which the CoTaZr film is provided as the soft magnetic back layer of the magnetic disk. However, the present invention is not limited thereto. The soft magnetic back layer may be made of FeTaC, FeTaN, FeAlSi, FeC, CoB, CoTaNb, or NiFe. Alternatively, the soft magnetic back layer may be a stacked or laminated film composed of a C film and a soft magnetic film made of any one of the foregoing compounds. However, it is most desirable to use the CoTaZr film.

The first and second embodiments have been explained as exemplified by the case in which the content of oxygen in the recording layer is adjusted by using the target obtained by mixing oxygen in the CoPtCr alloy when the CoPtCr alloy magnetic film containing oxygen is formed as the recording layer. However, the present invention is not limited thereto. The content of oxygen in the recording layer may be adjusted by performing the sputtering by using a mixed gas of oxygen and argon with a target containing no oxygen. Alternatively, the content of oxygen in the recording layer may be adjusted by performing the sputtering by using a mixed gas of oxygen and argon as the sputtering gas and using a target obtained by mixing oxygen in the CoPtCr alloy. However, it is most desirable that the content of oxygen in the recording layer is adjusted by using the target obtained by mixing oxygen in the CoPtCr alloy.

The first and second embodiments are illustrative of the magnetic disk in which the underlayer and the recording layer are stacked on the substrate. However, the present invention is not limited thereto. When the underlayer itself has a function to support the recording layer, it is allowable to provide no substrate in some cases.

According to the magnetic recording medium of the present invention, the crystalline orientation of the recording layer is improved, the coercivity is enhanced, and the medium noise can be reduced by using the CoCrRu film as the underlayer for the recording layer formed of the CoPtCr alloy magnetic film containing oxygen. Accordingly, it is possible to provide the magnetic recording medium which has the high coercivity, which undergoes the low medium noise, and which makes it possible to perform the high density recording. Further, it is possible to provide the magnetic recording apparatus provided with the same.

What is claimed is:

1. A magnetic recording medium comprising a soft magnetic back layer which is formed of a soft magnetic material; an underlayer; and a recording layer which is formed directly on the underlayer, which is composed of an alloy magnetic material mainly composed of CoPtCr containing oxygen, and which has residual magnetization in a direction perpendicular to a film surface larger than residual magnetization in an in-plane direction of the film surface; the soft magnetic back layer, the underlayer, and the recording layer being formed in this order on a non-magnetic substrate; wherein the underlayer is formed of an alloy mainly composed of CoCrRu.

2. The magnetic recording medium according to claim 1, wherein each of the recording layer and the underlayer has a hexagonal close-packed structure.

3. The magnetic recording medium according to claim 1, wherein a rocking curve half value width of a (002) peak in X-ray diffraction of CoPtCr having a hexagonal close-packed structure of the recording layer is not more than 8 degrees.

4. The magnetic recording medium according to claim 1, wherein the underlayer has a film thickness of 5 to 20 nm.

5. The magnetic recording medium according to claim 1, wherein the underlayer is a single layer.

6. The magnetic recording medium according to claim 1, wherein a distance between the soft magnetic back layer and the recording layer is not more than 40 nm.

7. The magnetic recording medium according to claim 1, wherein the recording layer has a thickness of not more than 20 nm.

8. The magnetic recording medium according to claim 1, wherein Co is contained by 1 to 65 at. % in the underlayer.

9. The magnetic recording medium according to claim 1, wherein an oxygen content of the recording layer is 5 to 20 at. %.

10. The magnetic recording medium according to claim 1, wherein Si or Mg is contained by 3 to 15 at. % in the recording layer.

11. A magnetic recording apparatus having a magnetic recording medium comprising, on a non-magnetic substrate, a soft magnetic back layer which is formed of a soft magnetic material, an underlayer, and a recording layer which is formed directly on the underlayer; the magnetic recording apparatus comprising a magnetic head and a drive unit which drives the magnetic recording medium relatively with respect to the magnetic head; wherein the recording layer is formed of an alloy magnetic material mainly composed of CoPtCr containing oxygen, residual magnetization in the recording layer in the direction perpendicular to the film surface is larger than residual magnetization in the in-plane direction of the film surface, and the underlayer is formed of an alloy mainly composed of CoCrRu.

12. The magnetic recording apparatus according to claim 11, wherein the magnetic head applies magnetization in a direction perpendicular to a film surface of the recording layer and applies magnetization in a direction parallel to a film surface of the soft magnetic back layer to constitute a magnetic circuit in cooperation with the recording layer and the soft magnetic back layer.

* * * * *